United States Patent [19]
Mantooth et al.

[11] Patent Number: 5,476,373
[45] Date of Patent: Dec. 19, 1995

[54] REVERSE DRIVE OIL PUMP

[75] Inventors: Michael N. Mantooth, Liverpool; Fadi S. Maalouf, Fayetteville; Fredric A. Ensworth; Martin C. Bezon, both of North Syracuse, all of N.Y.

[73] Assignee: Carrier Corporation, Syracuse, N.Y.

[21] Appl. No.: 337,717

[22] Filed: Nov. 14, 1994

[51] Int. Cl.⁶ .............................. F04C 2/356; F04C 15/02
[52] U.S. Cl. .............................. 418/32; 418/187; 418/248
[58] Field of Search .............................. 418/32, 186, 187, 418/248; 417/315

[56] References Cited

U.S. PATENT DOCUMENTS 3,649,141  3/1972  Belcher ................................. 418/186
5,366,355  11/1994  Patterson ................................. 418/32

FOREIGN PATENT DOCUMENTS 579450  11/1977  U.S.S.R. ................................. 418/186

*Primary Examiner*—John J. Vrablik

[57] ABSTRACT

Lubricant is pumped into a lubrication system by an oil pump. Preferably the lubricant is drawn into the pump from an unagitated source. An eccentric pump rotor is received on the crankshaft and has a circumferentially extending recess. A radially extending drive pin is secured in the crankshaft and coacts with the ends of the recess to position the rotor in accordance with the direction of rotation of the shaft.

3 Claims, 1 Drawing Sheet

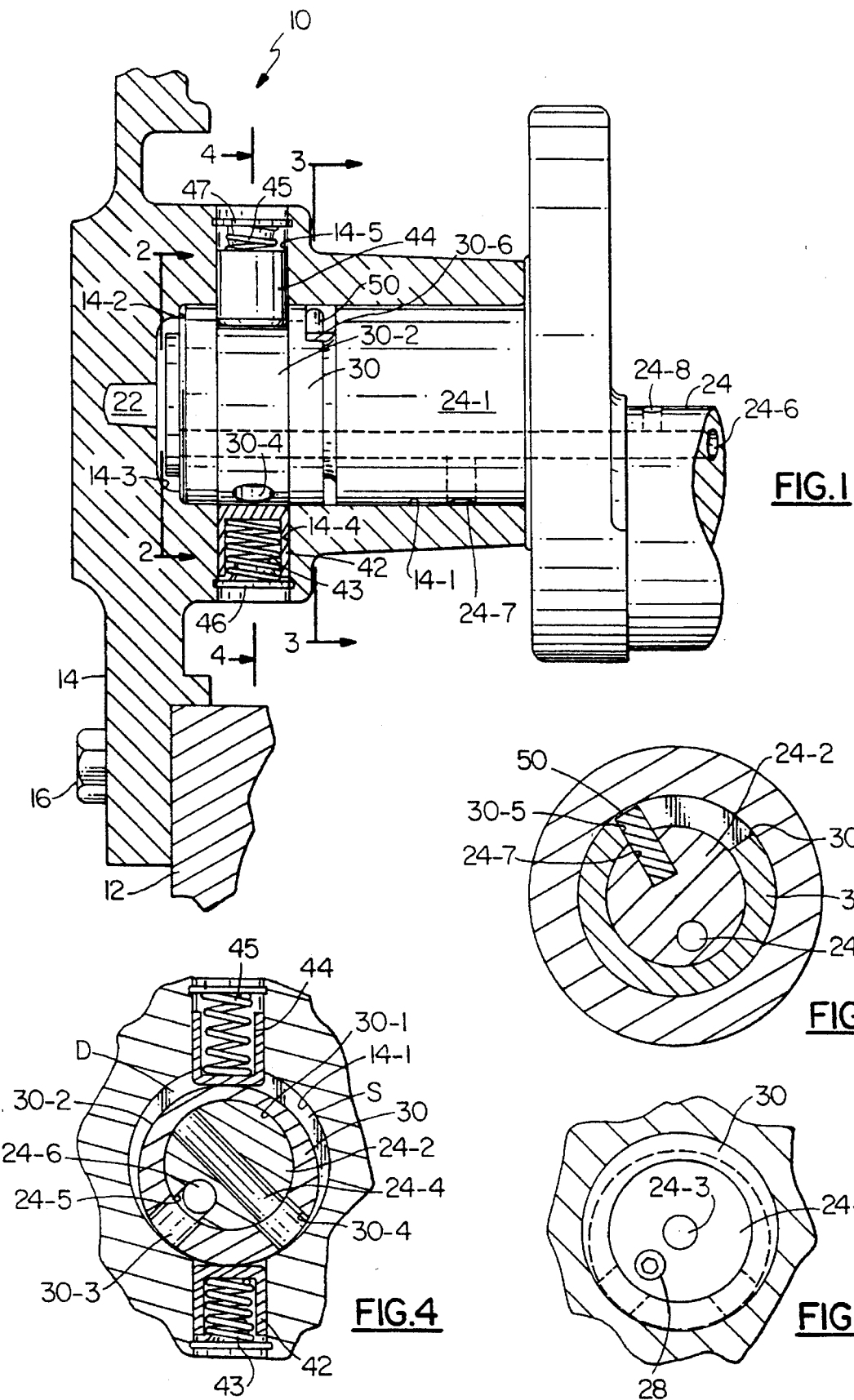

5,476,373

REVERSE DRIVE OIL PUMP

BACKGROUND OF THE INVENTION

Fluid machines such as compressors are typically lubricated by oil drawn from a sump by a pumping structure associated with the crankshaft. Centrifugal pumps and positive displacement pumps such as gerotors are commonly used to pump the oil. One problem associated with reciprocating compressors and rotary compressors such as scroll compressors is that they can run in reverse due to miswiring, and 3-phase operation can be in either direction. Also, some rotary compressors can run in reverse due to a pressure equalization across the compressor upon shut down. Under these conditions some types of oil pumps do not function properly and damage can result from lack of adequate lubrication. Those oil pumps that do function properly under reverse rotation conditions are, typically, relatively complicated and costly.

SUMMARY OF THE INVENTION

A positive displacement pump is driven by the shaft through a pin which coacts with a recess in an eccentric pump rotor. For either direction of rotation, the pin coacting with the recess causes the eccentric pump rotor to be properly positioned relative to the fluid passages to permit pumping of oil in one direction.

It is an object of this invention to provide a positive displacement oil pump having few parts, low cost and high reliability.

It is another object of this invention to reduce centrifugal effects tending to cause phase separation at the suction inlet to the oil pump.

It is a further object of this invention to provide a positive displacement oil pump suitable for horizontal and vertical compressors.

It is another object of this invention to provide a pump which pumps fluid in one direction independent of the direction of shaft rotation.

It is another object of this invention to provide an oil pump capable of pumping two phase flow. These objects, and others, as will become apparent hereinafter, are accomplished by the present invention.

Basically, lubricant, subject to being a two phase flow of lubricant and refrigerant gas, is pumped into a lubrication system by the oil pump. Preferably the lubricant is drawn into the pump from an unagitated source. An eccentric pump rotor is received on the crankshaft and has a circumferentially extending recess. A radially extending drive pin is secured in the crankshaft and coacts with the ends of the recess to position the rotor in accordance with the direction of rotation of the shaft.

BRIEF DESCRIPTION OF THE DRAWINGS

For a fuller understanding of the present invention, reference should now be made to the following detailed description thereof taken in conjunction with the accompanying drawings wherein:

FIG. 1 is a partially sectioned view of the oil supply structure;

FIG. 2 is an end view of the oil supply structure taken along line 2—2 of FIG. 1;

FIG. 3 is a sectional view taken along line 3—3 of FIG. 1; and

FIG. 4 is a sectional view taken along line 4—4 of FIG. 1.

DESCRIPTION OF THE PREFERRED EMBODIMENT

In FIG. 1, the numeral 10 generally designates a semi-hermetic reciprocating compressor having a casing 12. Pump housing and bearing member 14 is bolted to casing 12 by bolts 16. Pump housing and bearing member 14 has a first bore 14-1 and a second bore 14-3 coacting with bore 14-1 to form a shoulder 14-2. Bore 14-3 is connected to oil supply chamber 22 which is, in turn, connected to and fed by oil inlet structure connected to a sump (not illustrated).

Additionally, pump housing and bearing member 14 has a pair of bores 14-4 and 14-5 for respectively receiving cylindrical vanes 42 and 44. Spring 43 is retained in bore 14-4 by spring retainer 46 and biases vane 42 into tracking, sealing contact with annular rotor 30. Similarly, spring 45 is retained in bore 14-5 by spring retainer 47 and biases vane 44 into tracking, sealing contact with rotor 30. Crankshaft 24 has a first portion 24-1 supported by a bearing defined by bore 14-1 contained in member 14 and an overhung portion 24-2 which is received in and extends through annular rotor 30. Pump rotor 30 is located in bore 14-1 and surrounds the overhung portion 24-2 of crankshaft 24, as best shown in FIG. 4. Pump rotor 30 has a bore 30-1, an eccentric 30-2 that coacts with bore 14-1 to define a circumferentially extending recess made up of spaces S and D and radial ports 30-3 and 30-4 formed in the eccentric 30-2. Ports 30-3 and 30-4 are spaced approximately 90° apart and are symmetrical with respect to a tangent of the eccentric 30-2 with the rest of rotor 30. As best shown in FIGS. 1 and 3, drive pin 50 is located in radial bore 24-7 in overhung portion 24-2 of crankshaft 24. Drive pin 50 extends into a circumferentially extending recess formed in rotor 30 and engages either end surface 30-5 or 30-6 depending upon the direction of rotation of crankshaft 24. As illustrated in FIGS. 1 and 3, when crankshaft 24, and thereby rotor 30, is rotated counterclockwise, drive pin 50 is in engagement with end surface 30-5 and port 30-3 is a suction port and port 30-4 is a discharge port. When crankshaft 24, and thereby rotor 30, is rotated clockwise as illustrated in FIG. 4, port 30-4 is a suction port and port 30-3 is a discharge port. Vanes 42 and 44 are biased against the cylindrical surface of eccentric 30-2 by springs 43 and 45, respectively. Although vanes 42 and 44 are cylindrical, there is line contact between the vanes and the eccentric so that there is potential leakage while the line contact is passing over ports 30-3 and 30-4. Leakage is minimized by locating ports 30-3 and 30-4 in the portion of the eccentric 30-2 having the least depth, due to the restricted flow path between the vanes 42 and 44 the eccentric 30-2 as ports 30-3 and 30-4 pass over them and, ultimately, due to the wearing of the vanes into a surface conforming to the eccentric 30-2.

Crankshaft 24 has an axial bore 24-3 intersected by diametral bore 24-4. Depending upon the direction of rotation, one end of diametral bore 24-4 is in fluid communication with the one of ports 30-3 and 30-4 which is serving as a suction port while radial bore 24-5 is in fluid communication with the other one of ports 30-3 and 30-4 which is serving as a discharge port. Radial bore 24-5 is in fluid communication with axially extending bore 24-6 which is threaded to receive recessed bolt 28, as shown in FIG. 2, which seals bore 24-6 from chamber 22.

In operation, when crankshaft 24 is caused to rotate, depending upon the direction of rotation of crankshaft 24, either end surface 30-5 or end surface 30-6 is engaged by pin 50 causing pump rotor 30 to be driven as a unit with crankshaft 24. Axial bore 24-3 communicates with supply chamber 22 which is essentially undisturbed by the rotation of rotor 30 as it is driven by crankshaft 24. Thus, oil from supply chamber 22 which is essentially free of foam is drawn into bore 24-3 and fed to the oil pump.

Specifically, oil serially passes from supply chamber 22 through axial bore 24-3 and diametral bore 24-4. If, as illustrated in FIG. 4, crankshaft 24 and rotor 30 are rotating clockwise, pin 50 is in driving engagement with surface 30-6 and flow from bore 24-4 passes through port 30-4 into the space S between eccentric 30-2 and bore 14-1 which is circumferentially bound by the tangent point between eccentric 30-2 and bore 14-1 and the one of vanes 42 and 44 located counterclockwise with respect to port 30-4. Fluid from space D which is between eccentric 30-2 and bore 14-1 and circumferentially bound by the tangent point between eccentric 30-2 and bore 14-1 and the one of vanes 42 and 44 located clockwise with respect to port 30-3 is forced into port 30-3 and serially passes through radial bore 24-5 and bore 24-6. As crankshaft 24 rotates, the coaction of eccentric 30-2, bore 14-1, vanes 42 and 44 and the tangent sealing point between eccentric 30-2 and bore 14-1 causes oil to be drawn in and supplied to a pumping chamber via port 30-4 and forced out of a pumping chamber and supplied to bore 24-6 via port 30-3. The pumping chambers switch from suction to discharge as the suction port, 30-4 in FIG. 4, goes out of communication therewith and the discharge port, 30-3 in FIG. 4, comes into communication therewith. The reverse would be true if crankshaft 24 was rotating counterclockwise as illustrated in FIGS. 1 and 3. Oil passing through discharge port 30-3, radial bore 24-5 and into bore 24-6 is supplied to locations requiring lubrication by distribution means exemplified by bores 24-7 and 24-8.

Although a preferred embodiment of the present invention has been illustrated and described, other modifications will occur to those skilled in the art. It is therefore intended that the present invention is to be limited only by the scope of the appended claims.

What is claimed is:

1. A positive displacement pump for a fluid machine having an oil supply comprising:

a shaft having a rotational axis and including a first portion, an overhung portion extending from said first portion and oil distribution means;

a pump housing and bearing member having a continuous bore receiving said first portion in a bearing relationship;

annular eccentric rotor means located in said continuous bore and receiving said overhung portion which extends through said rotor means;

driving means connecting said rotor means and said overhung portion in a driving relationship such that a limited amount of relative rotational movement is permitted between a first position when said shaft is rotating about its rotational axis in a first direction and a second position when said shaft is rotating about its rotational axis in a second direction;

a pair of circumferentially spaced radially extending bores in said pump housing;

a pair of vane means located in said radially extending bores and in biased contact with said rotor means;

said rotor means, said pair of vane means and said continuous bore coacting to define a pair of trapped volumes and said shaft and said rotor means have means for supplying oil from said oil supply to said trapped volumes during a suction stroke and for supplying oil from said trapped volumes to said oil distribution means during a discharge stroke whether said shaft is rotating about its rotational axis in either said first or said second direction;

said driving means and said means for supplying oil from said oil supply being located on said overhung portion at opposite ends of said annular rotor.

2. The pump of claim 1 wherein two pumping cycles take place for each revolution of said shaft.

3. The pump of claim 1 wherein said rotor means has a circumferentially extending recess which coacts with said pair of vane means.

* * * * *